US010469655B2

(12) United States Patent
Chavez et al.

(10) Patent No.: US 10,469,655 B2
(45) Date of Patent: Nov. 5, 2019

(54) CALL RECONSTRUCTION SEQUENCED APPLICATION (71) Applicant: Avaya Inc., Santa Clara, CA (US)

(72) Inventors: David Chavez, Broomfield, CO (US); Keith Cowley, Lafayette, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/927,909

(22) Filed: Mar. 21, 2018

(65) Prior Publication Data

US 2019/0297184 A1 Sep. 26, 2019

(51) Int. Cl.
H04M 3/22 (2006.01)
H04M 3/51 (2006.01)
H04L 12/24 (2006.01)

(52) U.S. Cl.
CPC ...... *H04M 3/2263* (2013.01); *H04L 41/0654* (2013.01); *H04M 3/51* (2013.01)

(58) Field of Classification Search
CPC ... H04L 41/0654; H04M 3/51; H04M 3/2263; H04M 3/5191; H04M 7/0057; H04Q 3/0016
USPC ............ 379/265.09, 265.11, 265.05, 210.01, 379/221.03, 221.04
See application file for complete search history.

(56) References Cited

U.S. PATENT DOCUMENTS

| 7,366,110 | B2 | 4/2008 | Gillespie et al. |
| 7,483,369 | B2 | 1/2009 | Chavez et al. |
| 8,179,912 | B2 | 5/2012 | Cosmadopoulos et al. |
| 8,750,291 | B2 | 6/2014 | Balasaygun et al. |
| 9,344,460 | B2 | 5/2016 | Haserodt et al. |
| 2009/0196183 | A1* | 8/2009 | Kakadia .................. H04L 12/14 370/237 |
| 2014/0214972 | A1 | 7/2014 | Nemani et al. |
| 2016/0270128 | A1* | 9/2016 | Biage ...................... H04W 4/90 |
| 2016/0352838 | A1* | 12/2016 | Larkin ................ H04L 65/1006 |
| 2017/0026424 | A1 | 1/2017 | Sandgren et al. |
| 2017/0099323 | A1 | 4/2017 | Sandgren |

* cited by examiner

*Primary Examiner* — Thjuan K Addy
(74) *Attorney, Agent, or Firm* — Sheridan Ross P.C.

(57) ABSTRACT

Embodiments provide systems and methods for reconstructing a communication session upon a failure of a session manager by monitoring a communication session associated with a Universal Call IDentifier (UCID) and detecting a failure of the session manager. In some cases, A timer can be set in response to detecting the failure of the session manager. In response to the timer expiring before detecting the recovery of the session manager, the application server can end monitoring of the communication session. In response to detecting a subsequent recovery of the session manager, a re-invitation message associated with the communication session and including the UCID can be sent. Communications components of the contact center can receive and accept the re-invitation message, re-map a session initiated by the re-invitation message to the communication session based on the UCID from the re-invitation message, and reconstruct the communication session.

20 Claims, 4 Drawing Sheets

CALL RECONSTRUCTION SEQUENCED APPLICATION

FIELD OF THE DISCLOSURE

Embodiments of the present disclosure relate generally to methods and systems for reconstructing a call and more particularly to reconstructing a communication session upon a failure of a session manager through which the communication session is established and conducted.

BACKGROUND

A contact center can support interaction with customers over a variety of media and communication channels including, but not limited to, telephony, faxes, e-mail, web-based or other live support software, social media, instant message, internet chat and/or others. A caller can initiate an inbound communication such as a voice call from a telephone or other communication device. The call can be received at the contact center through a Session Border Controller (SBC). The SBC can send the call to a Session Manager (SM) where the call can be sequenced as an inbound call to the contact center and additional components of the contact center can be added to the call. For example, an Interactive Voice Response (IVR) system may be added to the call. The IVR system can allow the caller to interact with the contact center through a keypad of the caller's phone or by speech recognition and can respond with pre-recorded or dynamically generated audio to further direct the caller. A Communication Manager (CM) may also be added to the call. The CM maintains one or more queues into which the call may be placed to wait for an available or selected human agent to take the call and further communicate with the caller.

At some point while the call is being set up or conducted, a failure may occur. For example, the SM may fail or become temporarily unavailable. Once this failure occurs, components participating in the call, such as the IVR, CM, etc., flush records of the calls, end the call session, and start over. In this case, there is no way for the contact center system to know what the agent may or may not have done. Once the agent hangs up, there is no record that can be appended for end-to-end reporting. For businesses that are outsourcers that get paid by the call, significant revenue can be lost since there is no call record for any calls during the outage. Hence, there is a need for improved methods and systems for reconstructing a call.

BRIEF SUMMARY

Embodiments of the disclosure provide systems and methods for reconstructing a communication session upon a failure of a session manager through which the communication session is established and conducted. According to one embodiment, a method for reconstructing a communication session can comprise monitoring, by an application server of a contact center, a communication session with a caller. The communication session can include at least a session manager of the contact center and one or more communications components of the contact center and the communication session can be associated with a Universal Call IDentifier (UCID). The one or more communications components can comprise, for example, one or more of a Communication Manager (CM), an Interactive Voice Response (IVR) system, Call Recording system, Real-Time Analytics system, or a Session Border Controller (SBC). Monitoring the communication session can further comprise identifying, by the application server, the one or more communications components of the contact center in the communication session based on messages sent or received by the identified one or more communications components of the contact center being associated with the UCID.

During the communication session, a failure of the session manager can be detected by the application server. In some cases, a timer can be set by the application server in response to detecting the failure of the session manager. In response to detecting a subsequent recovery of the session manager, the application server can send to the one or more communications components of the contact center in the communication session a re-invitation message associated with the communication session. The re-invitation message can include the UCID. However, in response to the timer expiring before detecting the recovery of the session manager, the application server can end monitoring of the communication session.

The one or more communications components of the contact center can also detect the failure of the session manager during the communication session and set a timer in response to detecting the failure of the session manager. Subsequently, the one or more communications components of the contact center can receive the re-invitation message to the communication session from the application server, send an acceptance message to the application server in response to the re-invitation message, re-map a session initiated by the re-invitation message to the communication session based on the UCID from the re-invitation message, and reconstruct the communication session. However, if the timer expires before the communications components receive the re-invitation message from the application server, the one or more communications components can end the communication session.

According to another embodiment, a contact center system can comprise a session manager, one or more communications components, and an application server executing a communication session reconstruction application. The application server can comprise a processor and a memory coupled with and readable by the processor and storing therein a set of instructions which, when executed by the processor, causes the processor to reconstruct a communication session by monitoring a communication session with a caller. The communication session can include at least the session manager and the one or more communications components of the contact center and the communication session can be associated with a UCID. Monitoring the communication session can further comprise identifying the one or more communications components in the communication session based on messages sent or received by the identified one or more communications components being associated with the UCID. The instructions can further cause the processor to detect a failure of the session manager during the communication session and in response to detecting a recovery of the session manager, send to the one or more communications components a re-invitation message associated with the communication session. The re-invitation message can include the UCID. In some cases, the instructions can further cause the processor of the application server to set a timer in response to detecting the failure of the session manager and end monitoring of the communication session in response to the timer expiring before detecting the recovery of the session manager.

The one or more communications components can comprise one or more of a CM, an IVR system, or a SBC, for example. Each of the one or more communications components can comprise a processor and a memory coupled with and readable by the processor and storing therein a set of instructions which, when executed by the processor, causes the processor to reconstruct the communication session by detecting the failure of the session manager during the communication session and setting a timer in response to detecting the failure of the session manager. The instructions can further cause the processors of the one or more communications components to receive the re-invitation message to the communication session from the application server, send an acceptance message to the application server in response to the re-invitation message, re-map a session initiated by the re-invitation message to the communication session based on the UCID from the re-invitation message, and reconstruct the communication session. In other cases, the instructions can further cause the processors of the one or more communications components to end the communication session if the timer expires before receiving the re-invitation message from the application server.

According to yet another embodiment, a non-transitory, computer-readable medium can comprise a set of instructions stored therein which, when executed by a processor, causes the processor to reconstruct a communication session by monitoring, by an application server of a contact center, a communication session with a caller. The communication session can include at least a session manager of the contact center and one or more communications components of the contact center and the communication session can be associated with a UCID. Monitoring the communication session can further comprise identifying, by the application server, the one or more communications components of the contact center in the communication session based on messages sent or received by the identified one or more communications components of the contact center being associated with the UCID. The instructions can cause the application server to detect a failure of the session manager during the communication session and sending from the application server to the one or more communications components of the contact center in the communication session, a re-invitation message associated with the communication session in response to detecting a recovery of the session manager. The re-invitation message including the UCID. In some cases, the instructions can further cause the application server to set a timer in response to detecting the failure of the session manager and end monitoring of the communication session in response to the timer expiring before detecting the recovery of the session manager.

The one or more communications components of the contact center can comprise one or more of a CM, an IVR system, or a SBC, for example. These components can detect the failure of the session manager during the communication session and set a timer in response to detecting the failure of the session manager. The one or more communications components of the contact center can receive the re-invitation message to the communication session from the application server, send an acceptance message to the application server in response to the re-invitation message, re-map a session initiated by the re-invitation message to the communication session based on the UCID from the re-invitation message, and reconstruct the communication session. In other cases, the one or more communications components can end the communication session if the timer expires before receiving the re-invitation message from the application server.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
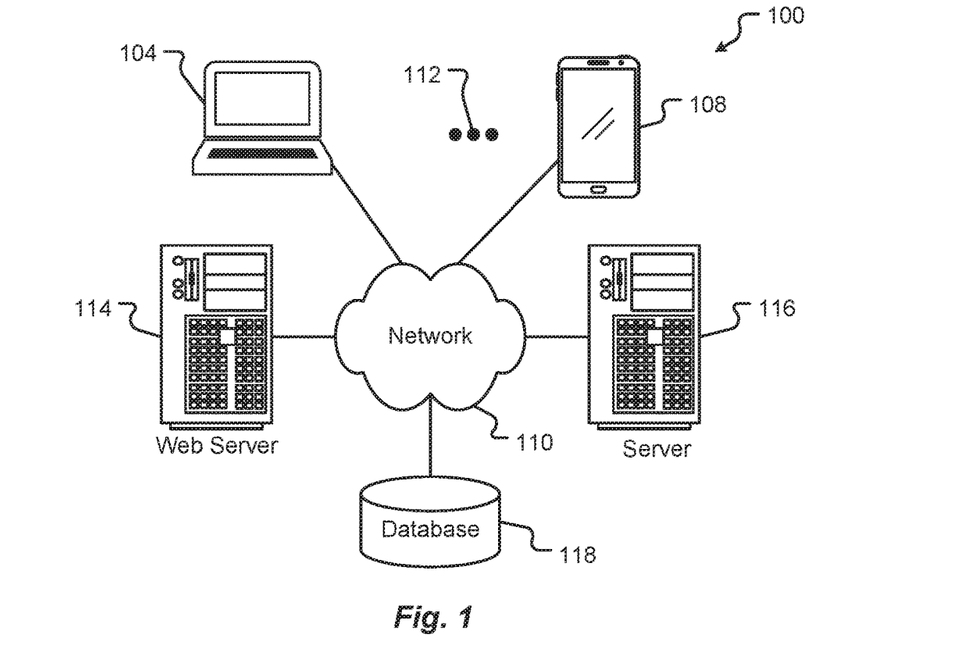
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
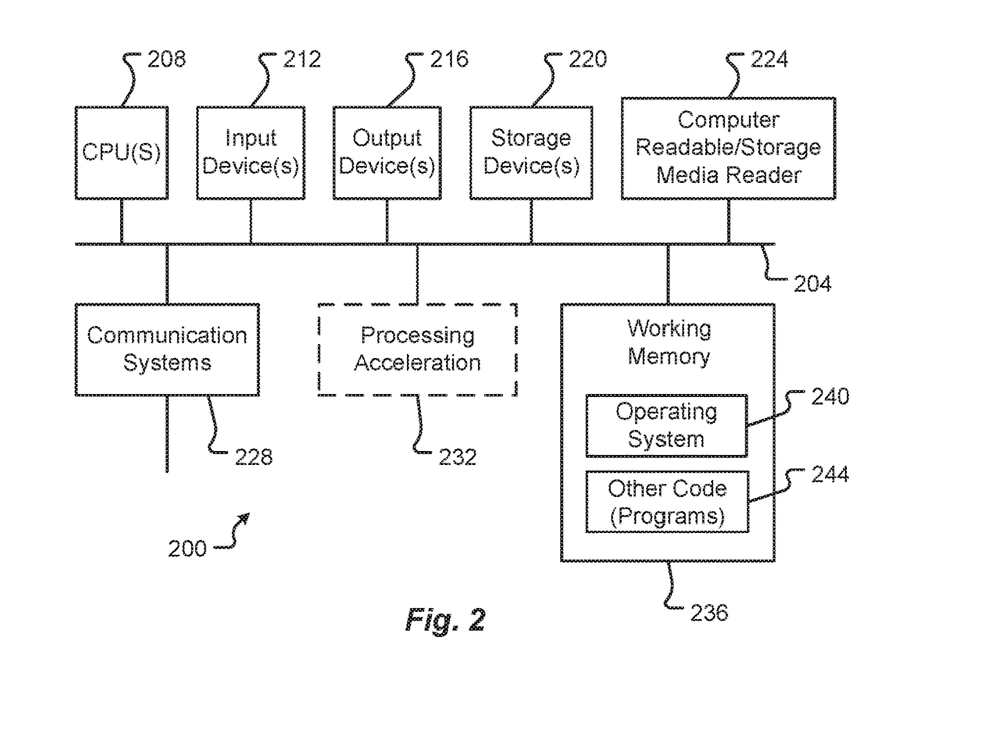
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
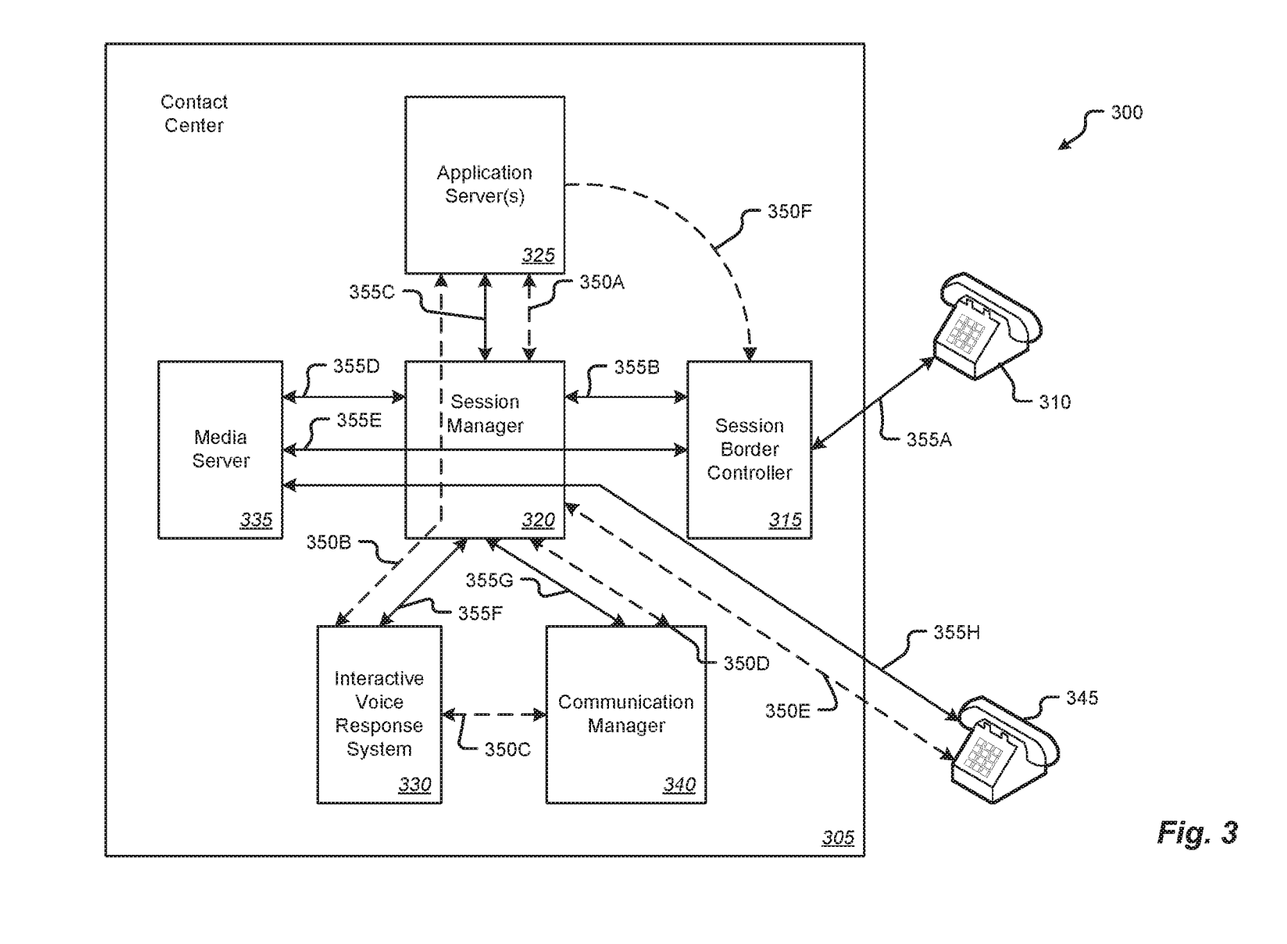
FIG. 3 is a block diagram illustrating an exemplary system in which call reconstruction can be performed according to one embodiment.

FIG. 3 is a block diagram illustrating an exemplary system in which call reconstruction can be performed according to one embodiment. As illustrated in this example, a system 300 in which call reconstruction can be performed can include a contact center 305. The contact center 305 can comprise any one or more servers, computers, or computing devices as described above communicatively couple with one or more private and/or public local area or wide area networks also as described above. Generally speaking, and as known in the art, a contact center 305 can support interaction with customers over a variety of media and communication channels including, but not limited to, telephony, faxes, e-mail, web-based or other live support software, social media, instant message, internet chat and/or others. These communications may be either or both inbound to or outbound from the contact center 305. Inbound communications can be made by consumers, for example, to obtain information, report a malfunction, or ask for help. In contrast, outbound communications can be made by agents of the contact center 305 to consumers, usually for sales or telemarketing purposes.

A caller can initiate an inbound communication such as a voice call from a telephone or other communication device 310 operated by the caller. The call can be received at the contact center through a Session Border Controller (SBC) 315. As known in the art, the SBC 315 can facilitate the signaling 350A-350F in conjunction with the other controlling elements (Session Manager 320, Application Server(s) 325, Media Server 335, Interactive Voice Response System 330, and Communication Manager 340), and the media streams 355A-355H involved in setting up, conducting, and tearing down telephone calls or other interactive media communications such as Voice over Internet Protocol (VoIP) calls or communications. The SBC 315 can also assign a Universal Call ID (UCID) to the call or communication session which can be thought of as a handle. This handle can be preserved throughout the communication session. Note that it is possible for there to exist additional controlling elements such as call recording systems and real-time analytic systems, this description is exemplary, and not meant to limit the components in the contact center 305.

The SBC 315 can send the call to a Session Manager (SM) 320 where the call can be sequenced as an inbound call to the contact center 305 as known in the art. As part of this sequencing, the session manager 320 may add or invite one or more application servers 325 to the communication session. The applications servers 325 can execute any of a variety of applications providing functionality to the communication session. In one example, and according to one implementation, the applications servers 325 can execute applications implementing using the Avaya Breeze® Platform (formerly Engagement Development Platform). According to one embodiment, applications executed by the application servers 325 can monitor the session manager 320 and can provide call reconstruction capability upon the failure and subsequent recovery of the session manager 320 as will be described in detail below.

As sequencing of the call continues, the session manager 320 can invite an Interactive Voice Response (IVR) system 330 to the communication session. As known in the art, the IVR system 330 can allow the caller to interact with the contact center system 305 through a keypad of the caller's device 310 or by speech recognition. The IVR system 330 can respond with pre-recorded or dynamically generated audio to further direct the caller. For example, the IVR system 330 can ask the caller for information (e.g., name, SS#, etc.). Accordingly, a media server 335 can provide media for such a dialog to the caller through the SBC 315. When the IVR dialog is completed, the IVR system may stay in the communication session and in the path or it may release the call.

Based on the information collected by the IVR system 330, the call can be placed in a queue of a Communication Manager (CM) 340 to be connected with an agent for handling further communications with the caller. In some cases, the media server 335 can remain in the communication session. For example, the contact center system 305 can play music or other audio provided by the media server 335 while the caller is on hold in the queue of the CM 340. When an agent becomes available, signaling of the communication session can be moved to the communication device 345 of the agent. In some cases, the media server 335 can stay in the communication session to provide features such as recording etc.

While the communication session is being set up as described above or at some point while it is being conducted, the SM 320 may experience a failure. Detecting 410 a failure of the session manager can be performed in a variety of ways as known in the art including but not limited to monitoring of a health check signal, detecting a delay in responding to one or more outstanding messages, etc. When such a failure happens, the SBC 315 can set a timer instead of terminating the communication session. The communication session can be recovered if the SM 320 recovers within the time period of the timer or the session can be terminated once the timer expires or when no packets are detected for a specific period.

For communication sessions established through the SM 320, any signaling messages received by the SM 320 involving the UCID would be known by the SM 320 as associated with the session indicated by the UCID. The SM 320 can then update the other components in the session such as the IVR system 330 and CM 340. Embodiments described herein take advantage of the UCID knowledge and update capabilities of the SM 320 to initiate and conduct call reconstruction. To do so, one or more applications executing on the application servers 325 can provide timers upon a failure of the SM 320 and can send a re-invitation 350F, e.g., a SIP Re-INVITE message, to the session upon recovery of the SM 320 to initiate call reconstruction.

According to one embodiment, the applications of the application servers 325 send a Re-INVITE or similar message 350F to the SBC 320 with the same UCID and with the same tagged information that the application servers 325 can see from all of the connections with the same route headers that provided flow information, e.g., the IVR system 330 is still in the flow or not. That is, by monitoring the exchange of signaling messages 350A-350F, the application servers 325 can identify components such as the IVR system 330 and/or CM 340 participating in the communication session at the time of SM 320 failure.

Based on this re-invitation message 350F, the communication session can be reconstructed/reestablished end-to-end. For example, if the IVR system 330 was participating in the session at the time of SM 320 failure, the IVR system 330 can answer the re-invitation, e.g., with a SIP 200 OK message. The IVR system 330 can then map the newly created session, i.e., created by the re-invitation and acceptance, to the previous UCID to identify this new session as the same call. The same process can be performed by the CM 340, i.e., the CM can accept the re-invitation message and map the new session to the previous session in which the SM 320 failed.

According to one embodiment, when the SM 320 fails, the IVR system 330 and CM 340 do not flush the records for the session. Rather, the IVR system 330 and CM 340 can also set a timer. Since these records are not flushed, the Via headers, the routing headers, and the UCID can be preserved and can be re-mapped back to the communication session as if the SM 320 failure didn't happen, including full call reconstruction without additional interference as if the failure didn't happen. However, if the timers set by the IVR system 330 and CM 340 expire before the re-invitation message is received, the session can be terminated and the records flushed.

Figure 4:
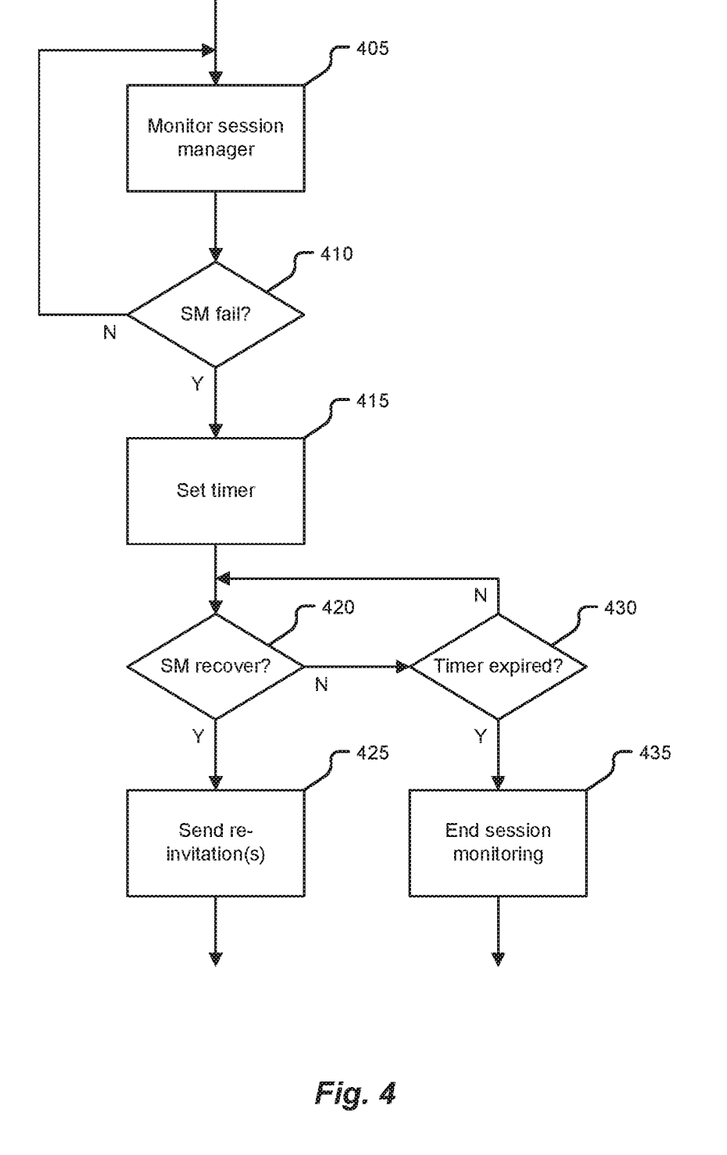
FIG. 4 is a flowchart illustrating an exemplary process for monitoring and reconstructing a communication session according to one embodiment.

FIG. 4 is a flowchart illustrating an exemplary process for monitoring and reconstructing a communication session according to one embodiment. Once a communication session with a caller has been initiated as known in the art and as described above, the application server of a contact center can begin monitoring 405 the communication session. As noted above, the communication session can include at least a session manager of the contact center and one or more communications components of the contact center. The communication session can be associated with a UCID and messages exchanged in the session can be identified with the UCID as known in the art. According to one embodiment, monitoring 405 the communication session can comprises identifying and monitoring the one or more communications components of the contact center in the communication session based on messages sent or received by the identified one or more communications components of the contact center being associated with the UCID.

At some point, as the communication session is being conducted and monitored 405, the application server may detect 410 a failure of the session manager during the communication session. Detecting 410 a failure of the session manager can be performed in a variety of ways as known in the art including but not limited to monitoring of a health check signal, detecting a delay in responding to one or more outstanding messages, etc. Once the failure of the session manager has been detected, and according to one embodiment, a timer may be set 415. This timer can be preset, for example, an amount of time during which recover of the session is likely to be effective and after which attempts to recover the session are problematic or likely to be ineffective.

During this period of time, and in response to detecting 420 a recovery of the session manager, the application server can send 425 to the one or more communications components of the contact center in the communication session, a re-invitation message. The re-invitation message can comprise, for example, a SIP INVITE or similar message to initiate a session. However, the message can be associated with the communication session, for example, by the re-invitation message including the UCID for the communication session. As will be described, this message can then be used by the communications components receiving it to reconstruct the communication session. However, in response to the timer expiring 430 before detecting 420 the recovery of the session manager, the application server can end 435 monitoring of the communication session.

Figure 5:
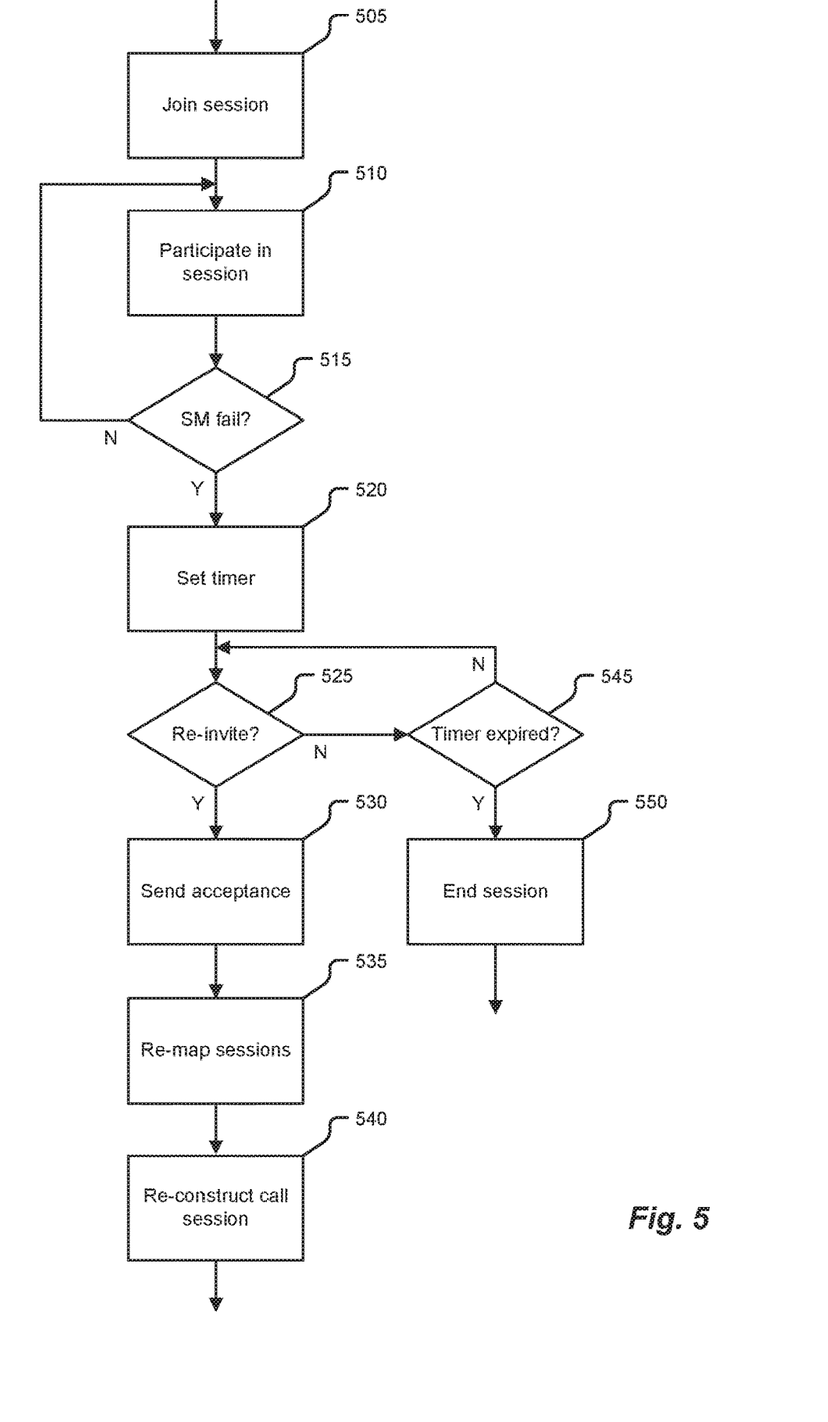
FIG. 5 is a flowchart illustrating additional details of an exemplary process for reconstruction a communication session according to one embodiment.

FIG. 5 is a flowchart illustrating additional details of an exemplary process for reconstruction a communication session according to one embodiment. More specifically, this example illustrates processes of the one or more communications components of the contact center to reconstruct a communication session upon a failure and subsequent recovery of the session manager. As noted above, the one or more communications components can comprise a CM, an IVR system, or a SBC, or another component of the contact center system support and/or participating in the communication session. When a call from a caller is received by contact center, the components can join 505 and participate 510 in the session as described above and as known in the art.

While the communication session is being conducted, the one or more communications components of the contact center may detect 515 a failure of the session manager. Detecting 515 a failure of the session manager can be performed in a variety of ways as known in the art including but not limited to monitoring of a health check signal, detecting a delay in responding to one or more outstanding messages, etc. Once the failure of the session manager has been detected, and according to one embodiment, a timer may be set 520. This timer can be preset, for example, an amount of time during which recover of the session is likely to be effective and after which attempts to recover the session are problematic or likely to be ineffective.

If the session manager recovers during this period, the application server can send a re-invitation message to communication components participating in the session as described above. In response to receiving 525 this re-invitation message, the communications components can send 530 an acceptance message to the application server in response. For example, and as noted above, the re-invitation message can comprise a SIP INVITE message to initiate a session. In such cases, the acceptance response can comprise a SIP OK message. Based on this or a similar exchange of messages, a session can be initiated between the application server and communications component. Since the re-invitation message includes the UCID of the communication session, the communications component can then re-map 535 the session initiated by the re-invitation message to the communication session and reconstruct 540 the communication session. A constructed session will have the same control topology of the original session, involve the same media components using the same IP addresses and port numbers as was established in the original session, and most importantly possess the same UCID. However, if the timer 545 expires before receiving 525 the re-invitation message from the application server the one or more communications components can end 550 the communication session.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for reconstructing a communication session, the method comprising:
    inviting, by a session manager, an application server of a contact center to a communication session between the contact center and a caller, wherein the application server executes one or more applications to provide functionality to the communication session;

monitoring, by the application server of the contact center, the communication session with the caller, wherein the communication session includes at least the session manager of the contact center, the application server, and one or more communications components of the contact center and wherein the communication session is associated with a Universal Call IDentifier (UCID);
detecting, by the application server, a failure of the session manager during the communication session; and
sending, from the application server to the one or more communications components of the contact center in the communication session, a re-invitation message associated with the communication session in response to detecting a recovery of the session manager, the re-invitation message including the UCID.

2. The method of claim 1, wherein monitoring the communication session further comprises identifying, by the application server, the one or more communications components of the contact center in the communication session based on messages sent or received by the identified one or more communications components of the contact center being associated with the UCID.

3. The method of claim 1, further comprising:
setting, by the application server, a timer in response to detecting the failure of the session manager; and
ending, by the application server, monitoring of the communication session in response to the timer expiring before detecting the recovery of the session manager.

4. The method of claim 1, wherein the one or more communications components of the contact center detect the failure of the session manager during the communication session and set a timer in response to detecting the failure of the session manager.

5. The method of claim 4, wherein the one or more communications components of the contact center receive the re-invitation message to the communication session from the application server, send an acceptance message to the application server in response to the re-invitation message, re-map a session initiated by the re-invitation message to the communication session based on the UCID from the re-invitation message, and reconstruct the communication session.

6. The method of claim 5, wherein the one or more communications components end the communication session if the timer expires before receiving the re-invitation message from the application server.

7. The method of claim 6, wherein the one or more communications components comprise one or more of a Communication Manager (CM), an Interactive Voice Response (IVR) system, Call Recoding System, Real-Time Analytics System, or a Session Border Controller (SBC).

8. A contact center system comprising:
a session manager that invites one or more communications components to a communication session and that invites an application server to the communication session along with the one or more communications components;
and
wherein the application server belongs to the communication session and executes a communication session reconstruction application, the application server comprising a processor and a memory coupled with and readable by the processor and storing therein a set of instructions which, when executed by the processor, causes the processor to reconstruct a communication session by:
monitoring the communication session with a caller, wherein the communication session includes at least the session manager and the one or more communications components of the contact center and wherein the communication session is associated with a Universal Call IDentifier (UCID);
detecting a failure of the session manager during the communication session; and
sending, to the one or more communications components, a re-invitation message associated with the communication session in response to detecting a recovery of the session manager, the re-invitation message including the UCID.

9. The contact center system of claim 8, wherein monitoring the communication session further comprises identifying the one or more communications components in the communication session based on messages sent or received by the identified one or more communications components being associated with the UCID.

10. The contact center system of claim 8, wherein the instructions further cause the processor of the application server to set a timer in response to detecting the failure of the session manager and end monitoring of the communication session in response to the timer expiring before detecting the recovery of the session manager.

11. The contact center system of claim 8, wherein the one or more communications components comprise one or more of a Communication Manager (CM), an Interactive Voice Response (IVR) system, Call Recording System, Real-Time Analytics System, or a Session Border Controller (SBC), each of the one or more communications components comprising a processor and a memory coupled with and readable by the processor and storing therein a set of instructions which, when executed by the processor, causes the processor to reconstruct the communication session by detecting the failure of the session manager during the communication session and setting a timer in response to detecting the failure of the session manager.

12. The contact center system of claim 11, wherein the instructions further cause the processors of the one or more communications components to receive the re-invitation message to the communication session from the application server, send an acceptance message to the application server in response to the re-invitation message, re-map a session initiated by the re-invitation message to the communication session based on the UCID from the re-invitation message, and reconstruct the communication session.

13. The contact center system of claim 12, wherein the instructions further cause the processors of the one or more communications components to end the communication session if the timer expires before receiving the re-invitation message from the application server.

14. A non-transitory, computer-readable medium comprising a set of instructions stored therein which, when executed by a processor, causes the processor to reconstruct a communication session by:
inviting, by a session manager, an application server of a contact center to the communication session between the contact center and a caller, wherein the application server executes one or more applications to provide functionality to the communication session;
monitoring, by the application server of the contact center, the communication session with the caller, wherein the communication session includes at least the session manager of the contact center, the application server, and one or more communications components of the contact center and wherein the communication session is associated with a Universal Call IDentifier (UCID);

detecting, by the application server, a failure of the session manager during the communication session; and sending, from the application server to the one or more communications components of the contact center in the communication session, a re-invitation message associated with the communication session in response to detecting a recovery of the session manager, the re-invitation message including the UCID.

15. The non-transitory, computer-readable medium of claim 14, wherein monitoring the communication session further comprises identifying, by the application server, the one or more communications components of the contact center in the communication session based on messages sent or received by the identified one or more communications components of the contact center being associated with the UCID.

16. The non-transitory, computer-readable medium of claim 14, wherein the instructions further cause the application server to set a timer in response to detecting the failure of the session manager and end monitoring of the communication session in response to the timer expiring before detecting the recovery of the session manager.

17. The non-transitory, computer-readable medium of claim 14, wherein the one or more communications components of the contact center detect the failure of the session manager during the communication session and set a timer in response to detecting the failure of the session manager.

18. The non-transitory, computer-readable medium of claim 17, wherein the one or more communications components of the contact center receive the re-invitation message to the communication session from the application server, send an acceptance message to the application server in response to the re-invitation message, re-map a session initiated by the re-invitation message to the communication session based on the UCID from the re-invitation message, and reconstruct the communication session.

19. The non-transitory, computer-readable medium of claim 18, wherein the one or more communications components end the communication session if the timer expires before receiving the re-invitation message from the application server.

20. The non-transitory, computer-readable medium of claim 19, wherein the one or more communications components comprise one or more of a Communication Manager (CM), an Interactive Voice Response (IVR) system, Call Recording system, Real-Time Analytics system, or a Session Border Controller (SBC).

* * * * *